T. M. LILLISTON.
PEANUT STEMMER.
APPLICATION FILED JAN. 21, 1913.
1,078,506.
Patented Nov. 11, 1913.
2 SHEETS—SHEET 2.
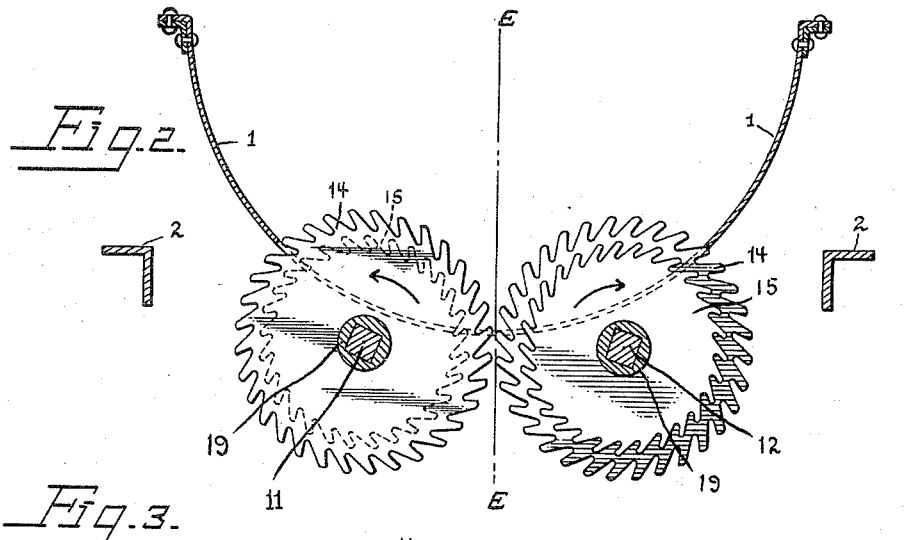
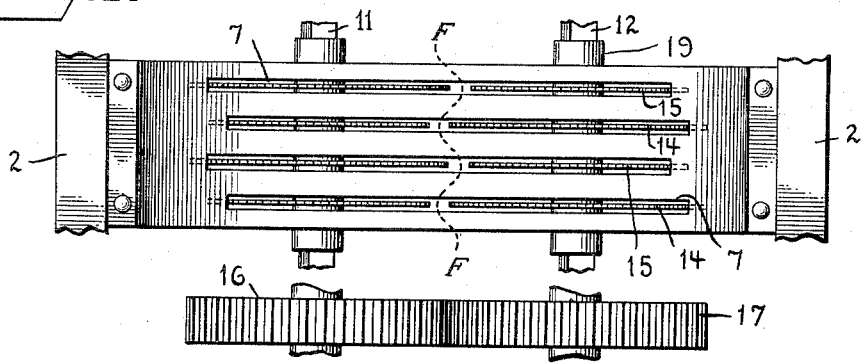
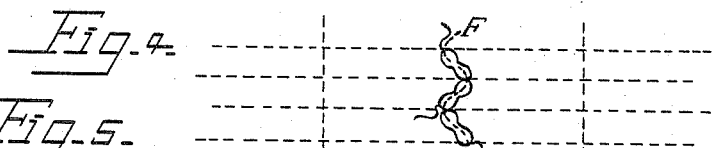
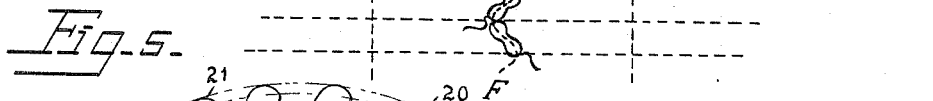
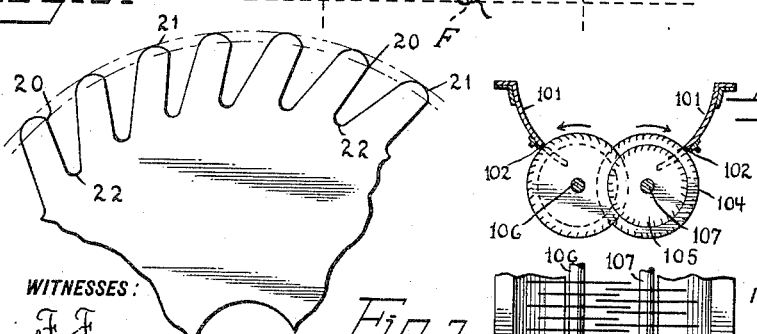
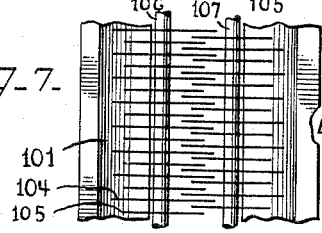
WITNESSES:
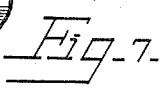
INVENTOR
Thomas M. Lilliston
BY
George W. Ramsey
ATTORNEY

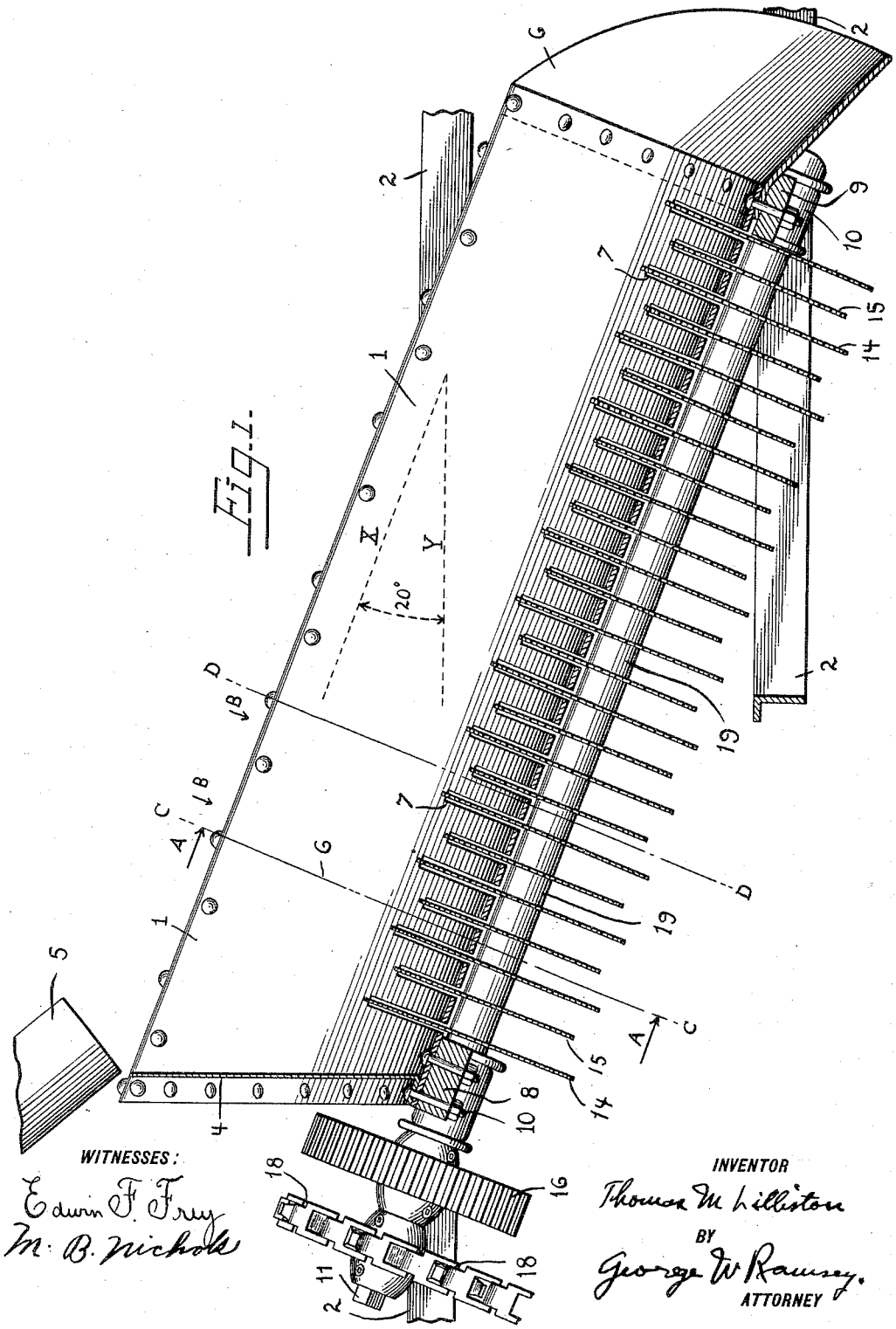

UNITED STATES PATENT OFFICE.

THOMAS M. LILLISTON, OF SUFFOLK, VIRGINIA, ASSIGNOR TO NATIONAL MACHINE CORPORATION, OF SUFFOLK, VIRGINIA, A CORPORATION OF VIRGINIA.

PEANUT-STEMMER.

1,078,506.  Specification of Letters Patent.  Patented Nov. 11, 1913.

Application filed January 21, 1913. Serial No. 743,319.

*To all whom it may concern:*

Be it known that I, THOMAS M. LILLISTON, a citizen of the United States, and a resident of the city of Suffolk, in the county of Nansemond, State of Virginia, have invented certain new and useful Improvements in Peanut-Stemmers, of which the following is a specification.

This invention relates broadly to mechanisms for threshing and more particularly to mechanisms designed for stemming peanuts.

The principal object of the invention is to construct a peanut stemming mechanism comprising a peanut container and a plurality of stemming saws extending into the container, the parts being arranged in such manner that the path of the peanut pods is transverse the plane of rotation of the saws.

A further object of this invention is to construct a peanut stemmer wherein the movable parts are reduced to a minimum, and in which the progression of the peanut pods is produced by inclining the stemming saws to the horizontal in such manner that as the pods are lifted by the saws the action of gravity causes them to fall away from the saw by which they have been lifted and to engage the succeeding saw, thereby moving the peanuts step by step from one end of the stemmer to the other.

A still further object of this invention is to produce a peanut stemmer including two series of stemming saws, comprising relatively large and small saws, arranged in alternation in each series and oppositely disposed in such manner that a large saw in one series is arranged substantially opposite to a small saw in the other series, thereby causing a zig-zag path between or over the saws, to tilt or incline the peanut pods as they pass through the stemmer thus effectively presenting the ends of the pods toward the stemming saws.

Other and further objects of this invention will in part be obvious and will in part be pointed out in the specification hereinafter following by reference to the accompanying drawings in which like characters represent like parts throughout the several figures thereof.

Figure 1 is a vertical sectional elevation taken substantially on the mid-plane of the device, as for example, the line E—E, Fig. 2. Fig. 2 is a view of a section of the device taken between the lines C—C and D—D of Fig. 1, and looking in the direction of the arrows A—A. Fig. 3 is a sectional detail comprising a plan view of a portion of the stemming device, said portion being substantially equivalent to the section between the lines C—C and D—D, Fig. 1, looking in the direction of the arrows B—B, but showing the stemming saw shafts extending a slight distance beyond the limits of said section lines. Fig. 4 is a diagrammatic view showing the effect of a staggered relation of the stemming saws in relation to the path taken by peanut pods in passing through the machine. Fig. 5 is a fragmentary detail view of a portion of one of the stemming saws. Fig. 6 is a detail cross elevation showing a section of a modification of the device wherein the stemming trough is entirely open in the mid-portion of the bottom. Fig. 7 is a detail plan view of a modification of the invention referred to in Fig. 6, showing the overlapping relationship of the stemming saws as they are arranged in this modification of the invention.

The art relating to peanut stemmers shows it to be old and well known to use a stemming saw construction for cutting the stems from the peanut pods after the peanuts have been pulled or picked from the vines. The devices disclosed in the prior art relating to peanut stemming mechanism of this character, are devices wherein the direction of movement of the peanut pods at the time when they are presented to the stemming saws, is substantially parallel to the plane of rotation of the saws.

Applicant's device, which will hereinafter be described in detail, comprises a peanut stemmer wherein the plane of rotation of the saws is substantially at right angles to the general direction of the peanuts in passing through the stemming mechanism, and the movement of the peanuts, from the entrance end of the stemmer to the exit end, is accomplished by inclining the stemming saws to the horizontal thereby causing the stemming saws to lift such peanuts as may be caught thereby and to permit them to drop by gravity from the plane of rotation of one saw to the other. This causes the peanut pods to take a rapid step by step movement through the stemmer, which movement becomes substantially a continuous progression when the stemmer is filled with pods. In applicant's device the peanuts must pass each and every saw in a series in passing from one end of the stemmer to the other, whereas in devices of the prior art the peanuts pass only such saws as are arranged transverse the path of the particular peanut pod which is passing through the machine.

From the foregoing broad description it will be noted that applicant's construction is both simple and economical in that the only rotating parts are the stemming saws, and that the maximum efficiency of these saws is secured because of the fact the progressive movement of the pods through the machine requires the pods to encounter at least as many saws as are in one series and in practice causes a pod to encounter substantially all of the saws in the device before the pod passes from the exit end of the stemmer.

Referring now to the drawings and more especially to Figs. 1 and 2, the preferred form of the stemming mechanism comprises a stationary trough or container 1 which is fixedly mounted upon or within framework 2 in such manner that the axis of the stationary container is considerably inclined to the horizontal. Practice has shown that a preferable inclination is that of twenty degrees, as is indicated in Fig. 1 by the angle between the horizontal line Y and the line X, which is parallel to the axis of the trough. The trough 1 is preferably provided with a closed upper end 4 adjacent an inlet chute 5, and an open lower end provided with an exit chute 6. The wall or bottom of the trough is provided with a plurality of transverse slots 7 which are preferably spaced an equal distance apart and which extend in alternation to different distances on each side of the center line of the trough, as is best shown in Fig. 3.

The stationary trough 1 is disclosed in the figures of the drawings as being a metallic trough of substantially semi-circular cross section. The trough may be formed of other material than metal and may be V-shaped, rectangular or other shape in cross section, but the semi-circular form is shown as the preferred configuration.

Mounted upon the framework in the proper relationship one to the other, is a supporting bracket 8 beneath the upper end of the trough, and a supporting bracket 9 beneath the lower end of the trough. These supporting brackets are adapted to carry the bearings 10 for shafts 11 and 12. In the preferred form illustrated, the shafts 11 and 12 are substantially parallel to the axis of the stemming trough. Each shaft referred to is adapted to carry a plurality of stemming saws comprising large stemming saws 14, arranged in alternation with small stemming saws 15, as is clearly disclosed in Figs. 1 and 2.

By referring to Figs. 2 and 3 it will be noted that in the preferred form a large stemming saw 14 upon one shaft is arranged substantially opposite and in the same slot, as a small stemming saw 15. The shafts are spaced so that the stemming saws do not interfere one with another, but are sufficiently close so that a line drawn on the bottom of the hopper midway between the series of saws would be a waved line somewhat similar to line F—F of Figs. 3 and 4. In arranging the saws in this manner it will be noted, particularly from the diagrammatic Fig. 4, that as the peanuts pass over or between the saws there is a continual tendency to tip the peanuts with reference to the direct axis of the trough, thus more effectively presenting the stem end of the peanut to the stemming saws and consequently thereby increasing the probability of the stem being cut off, and increasing the probability of stemming all of the peanuts which pass from one end of the device to the other.

By referring to Fig. 2 it will be noted that the saws carried by the shaft 11 have their teeth inclined in one direction while the saws carried by the shaft 12 have their teeth inclined in the opposite direction. The shafts are geared together by means of gears 16 and 17 in such manner that the shafts rotate in opposite directions and they are preferably driven, as indicated by the arrows in Fig. 2, so that the upper portion of the saws run toward the sides, and away from the bottom of the container or trough. This action has a tendency to constantly lift the peanuts, which will fall to the bottom of the trough under the influence of gravity as soon as they escape from a saw. Thus as the peanuts are lifted and the stems cut off they will fall away from the plane of rotation of the particular saw which has cut the stem, as will be obvious from an inspection of Figs. 1 and 2. As the pod falls from the saw, it will roll downward against the succeeding saw in the series, be lifted thereby, and repeat this action until it has passed the last stemming saw in the series, from which it will roll to the exit chute 6, and be discharged from the stemmer.

One of the shafts, for example shaft 11, is provided with a driving gear 18, which has been illustrated as a chain sprocket gear, and which may be driven from any source of power to rotate the stemming shafts.

Referring to Figs. 2 and 3, the portion of the shafts 11 and 12 upon which the stemming saws are mounted, is illustrated as having a square cross section, and spacing collars 19 are shown as being carried by the shafts to properly space the stemming saws. Any other well known construction may be used with equal facility within the scope of this invention to fasten the stemming saws upon the shafts.

Referring to Fig. 5, which is a fragmentary view of a stemming saw, it will be noted that the teeth of the stemming saws are arranged in such manner that the points 20 thereof lie within a circumference which is less than the circumference in which the heels 21 of the teeth are located, and that the throats 22 of the teeth are rounded. This type of construction prevents the peanut pods from being injured, by the points of the teeth, at the same time presents a very effective saw for severing the stem of the peanut. The rounded portion of the throat prevents the saw clogging by wedging of stems as is a common occurrence where the throats are formed by the lines of the teeth meeting in a sharp acute angle.

Referring particularly to Figs. 6 and 7, the modification therein illustrated comprises a container, or trough, 101 in which the entire central or middle portion of the bottom is cut away, thus forming an open space through which dirt and small trash may fall. The side walls of the container or trough 101 are formed with projecting ribs 102 that extend downwardly between the stemming saws 104 and 105, the stemming saws being carried upon shafts 106 and 107 respectively, as in the preferred form of the device. The stemming saws 104 and 105 are very closely arranged so that the space between the saws on a shaft is considerably less than the diameter of a normal sized peanut, and the portions of the stemming saws which are shown as overlapping, run with only sufficient clearance to prevent actual contact. From this description it will be noted that in the modification, the bottom of the container or trough is substantially made up of the stemming saws themselves so that the peanut pods rest directly upon the saws.

In the modified form disclosed in Figs. 6 and 7, the saws are preferably run in opposite directions, as is indicated by the arrows. However, under some conditions it is desirable to run the saws in the same direction. The direction of rotation of the saws does not form a part of the present invention.

Having thus described my invention what I desire to claim is:—

1. A peanut stemmer comprising a stationary trough having its axis inclined to the horizontal and being provided with an open lower end, a pair of inclined shafts mounted beneath said stemming trough and having their axes substantially parallel with the axis of said trough, said trough being provided with a plurality of transverse slots in the wall thereof, a series of relatively large and small stemming saws carried by each shaft, said series being arranged in alternation on each shaft and in alternation regarding the relation of one shaft to the other so that a large saw upon one shaft is substantially opposite to a small saw upon the other shaft, the teeth of the saws carried by one shaft being oppositely inclined from the teeth of the saws upon the other shaft, and gearing for rotating said shafts in opposite directions toward the side walls of said trough.

2. A peanut stemmer comprising in combination a stationary trough being provided with an open lower end and having its axis substantially inclined to the horizontal, said trough being provided with a plurality of transverse slots in the bottom thereof, a shaft mounted beneath said trough, said shaft having its axis substantially parallel to the axis of said trough, a plurality of stemming saws mounted upon said shaft and having a portion of their circumference extending within said trough, the plane of rotation of said saws intersecting the axis of said trough at substantially right angles, and means for rotating said shaft in the direction of the inclination of the teeth of said stemming saws.

3. In a device of the class described in combination, a trough being provided with slots in the wall thereof, a pair of shafts mounted beneath said trough, said shafts being inclined at substantially the same angle as said trough, a series of relatively large and small stemming saws carried by each of said shafts, said series being alternately arranged to present a large saw on one shaft substantially opposite a small saw on the other shaft to form a zig-zag passageway between said series of saws, gearing connecting said shafts to rotate the same in opposite directions, and means for driving said shafts.

4. In a device of the class described in combination, a stationary inclined trough provided with transverse slots in the wall thereof, and having an open lower end, a shaft carrying a plurality of saws having a portion of their circumference extending through said slots in said trough, said shaft being inclined at substantially the same angle as said trough, and means for rotating said shaft toward the side of the trough whereby peanuts and the like may be stemmed by said saws.

5. A stationary container for peanuts having its axis inclined to the horizontal, means for introducing peanuts into the upper end of said container, means provided for the exit of said peanuts from the lower end of said container, and a plurality of stemming saws having their plane of rotation transverse the path of said peanuts in their passage from one end of said container to the other, and means for rotating said stemming saws.

6. In a device of the class described in combination, a stationary inclined trough provided with transverse slots in the wall thereof, said trough being provided with an open end, a shaft rotatably mounted beneath said trough, a plurality of relatively large and small stemming saws mounted upon said shaft and arranged in alternate series thereon, and means for rotating said shaft to turn the saws toward the side of said container.

7. A peanut stemmer comprising in combination a stationary container for peanuts provided with slots in the wall thereof, means for introducing peanuts into one end of said container in such manner as to cause the peanuts to traverse the length of said container, a pair of shafts having their axes substantially parallel to the axis of said container, a plurality of stemming saws mounted upon said shafts, and means for rotating said shafts in opposite directions toward the sides of the trough, substantially as described.

8. In a device of the class described in combination, a trough having a plurality of transverse slots formed in the wall thereof, a pair of parallel shafts, each shaft carrying a series of relatively large and small stemming saws arranged in alternation thereon, a large stemming saw on one shaft arranged opposite to a small stemming saw on the other shaft whereby a zig-zag passageway is formed between the portions of said saws extending into said trough, and means for rotating said shafts.

9. In a peanut stemmer in combination, an inclined stationary container for said peanuts, a plurality of stemming saws extending into said container, said stemming saws having their planes of rotation inclined, and means for rotating said stemming saws toward the sides of the container in such manner that after the stem has been cut from a peanut by said saw the peanut drops by gravity away from the plane of rotation of said saw.

10. In a device of the class described in combination, an inclined trough provided with transverse slots in the wall thereof, a shaft, a plurality of saws mounted upon said shaft and having a portion of their blades extending through said slots within said trough, said shaft also being inclined, and means for driving said shaft to rotate the saws toward the sides of the trough.

11. In a device of the class described in combination, a stationary inclined trough having transverse slots in the wall thereof, a pair of parallel shafts mounted beneath said trough, a plurality of stemming saws carried by each of said shafts and extending into the trough, and means for rotating said shafts for the purpose of stemming peanuts and the like and to lift the peanuts from the bottom of the trough.

THOMAS M. LILLISTON.

Witnesses:
R. L. WOODWARD,
W. G. ELAM.

---

Copies of this patent may be obtained for five cents each, by addressing the "Commissioner of Patents, Washington, D. C."